United States Patent [19]
Bettini et al.

[11] 3,943,569
[45] Mar. 9, 1976

[54] CASSETTE TAPE TRANSPORT WITH ADJUSTABLE HEAD

[75] Inventors: Giuseppe Bettini, Ivrea (Turin); Carlo Romano, Montalto Dora (Turin), both of Italy

[73] Assignee: Ing. C. Olivetti & C., S.p.A., Ivrea (Turin), Italy

[22] Filed: Sept. 3, 1974

[21] Appl. No.: 503,005

Related U.S. Application Data

[62] Division of Ser. No. 331,926, Feb. 12, 1973, abandoned.

[30] Foreign Application Priority Data

Feb. 11, 1972 Italy .................................. 52901/72
May 13, 1972 Italy .................................. 68505/72

[52] U.S. Cl. .............................................. 360/109
[51] Int. Cl.² ...................... G11B 5/56; G11B 21/24
[58] Field of Search ........................... 360/109, 105

[56] References Cited
UNITED STATES PATENTS

| | | | |
|---|---|---|---|
| 3,502,820 | 3/1970 | Zenz | 360/109 |
| 3,571,524 | 3/1971 | Kozu et al. | 360/105 |
| 3,680,871 | 8/1972 | Tupaj et al. | 360/105 |
| 3,705,270 | 12/1972 | Huber | 360/109 |
| 3,833,925 | 9/1974 | Jenkins | 360/105 |

*Primary Examiner*—Robert S. Tupper
*Attorney, Agent, or Firm*—I. J. Schaefer

[57] ABSTRACT

This apparatus is used for recording and/or playing back a magnetic tape contained in a cassette provided with a hole for receiving a capstan roller and edge apertures for receiving a pressure roller adapted to press the tape against the capstan roller and a recording and/or reading head. The pressure roller is rotatably mounted between two parallel support levers which are pivotally mounted on the base about the same pivotal axis. A third lever pivoted about the said axis is coupled to the support levers by a lost motion coupling allowing limited relative pivotal mouvement between the support levers on the one hand and the third lever on the other hand. This apparatus further comprises a single actuation member which is movably mounted on the base to move the third lever to a position in which the pressure roller is moved into its position of engagement.

3 Claims, 8 Drawing Figures

CASSETTE TAPE TRANSPORT WITH ADJUSTABLE HEAD

This is a division, of application Ser. No. 331,926 filed Feb. 12, 1973 and now abandoned.

BACKGROUND OF THE INVENTION

1. Field of the invention

The present invention relates to an apparatus for recording and/or playing back a magnetic tape contained in a cassette of the type known commercially as a musicassette in which the tape is wound on two coplanar spools, enclosed in a rectangular housing. The hub of each spool rotates in opposed apertures through the broad walls of the housing and is bored and internally toothed to receive a drive shaft.

Generally such cassettes are provided in the front part with reference holes through their thickness to receive positioning pins and have edge apertures through which the exposed tape can be engaged by a pressure roller and a recording and/or reading head.

2. Description of the prior art

In a known apparatus for recording and/or playing back a magnetic tape contained in a cassette, there are two capstan rollers and two pressure rollers which act selectively to transpor the tape forwards or else backwards. An actuating movable plate positions both the pressure rollers simultaneously into the proximity of the respective capstan rollers. Each one of the pressure roller can be brought into pressure contact with the corresponding capstan roller by means of a selectively controlled corresponding electromagnet.

Each of the pressure rollers is rotatably mounted between two support levers arranged parallel and pivoted on a single axis. A third lever fulcrumed on the said axis is connected elastically to the first two levers and is driven directly by the control electromagnet. Since this apparatus comprises a pair of electromagnets for the selective actuation of the pressure rollers, it is unnecessary expensive for systems wherein the magnetic tape is recorded and/or playing back only forwards.

The apparatus can incorporate an improved means for fine adjustment of the position of the recording and/or reading head.

A device is known in which the head is fixed to a base plate by screws, coaxially to each of which there is arranged a coil spring which opposes the action of the screw. Such a device has, however, the drawback of not preventing possible displacements of the recording and/or reading head in a reading head in a direction perpendicular to the screws. Furthermore, such a device turns out to be not easy to assemble because of the number of components which it uses.

There is also known another adjustment device similar to the previous one, in which a single helical spring is arranged below the recording and/or reading head in a substantially central position and is directly supported on the base blate. This device, while indeed having a simpler assembly than the previous one, does not obviate the disadvantage of not locating the head in the direction parallel to the base plate. Furthermore, such devices having a limited space for the accommodation of the spring means, the use of helical springs does not allow high spring reactions to be achieved.

SUMMARY OF THE INVENTION

A first object of the present invention is to simplify the engagement of the head and the pressure roller with tape, particularly for recording and/or reading digital information. According to said first object, said apparatus comprises a recording and/or reading head movable on the base for movement between disengaged and engaged positions relative to the tape, and a pressure roller mounted on the base for movement between disengaged and engaged positions relative to the capstan roller. The pressure roller is rotatably mounted between two parallel support levers which are pivotally mounted on the actuating base about the same pivotal axis, a third lever pivoted about the said axis independently of the support levers is coupled to the support levers by a lost motion coupling allowing limited relative pivotal movement between the support levers on the one hand and the third lever on the other hand, a resilient coupling between the support levers and the third lever urges the support levers to move relative to capstan roller and a single actuation member is movably mounted on the base and arranged on movement to an actuated position simultaneously to move the head into its position of engagement and to move the third lever to a position in which the pressure roller is moved into its position of engagement.

A second object of the invention is to prevent the tape cassette from being moved under circumstances which could result in damage to the cassette and/or the head. According to this object, the apparatus further comprises a container for the cassette movably mounted on the base for movement between a rest position in which a cassette may be inserted in or removed from the container, and a working position in which the cassette is positioned to receive the head in pressure roller in corresponding edge apertures, wherein the actuating member carries a projection adapted so to engage with a hook carried by the container as to prevent the container moving between its two positions when the actuation member is in the said actuated position.

The apparatus is further provided with a positioning plate wherein the head is mounted. The positioning plate is mounted in turn on the actuation member by means of at least three adjusting screws acting against a single leaf spring. This spring is coupled by locating means at the centre thereof to the position plate and has arms which engage the head adjacent the adjusting screws.

By this means it is intended to simplify the assembly of the adjusting device, to make the system rigid with regard to thrusts of the recording and/or reading head in the direction parallel to the supporting plate and to increase the precision of the adjustment.

BRIEF DESCRIPTION OF THE DRAWINGS

A preferred embodiment of the invention is presented by way of example in the following description and in the accompanying drawings, in which.

DESCRIPTION OF A PREFERRED EMBODIMENT OF THE INVENTION

Figure 4:
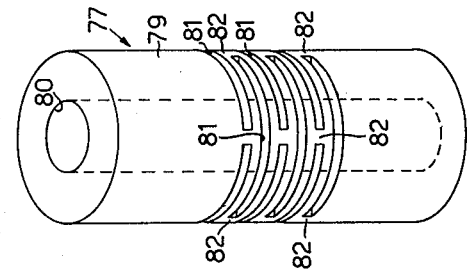
FIG. 4 is a perspective view of a first detail of the apparatus.

A cassette 10 of known type (FIGS. 1, 2 and 3), for example similar to that described in the aforementioned specification, comprises an outer casing inside which, wound on two spools 12 and 13, there is arranged a magnetic tape 14.

On the front edge 20 the cassette 10 is provided with a pair of apertures 21 for the tape drive, a pair of apertures 22 for a photoelectric control device and a central recording and/or reading apertures 23. Through the apertures 21 and 23 the tape 14 can come into contact with the drive members and with the recording and/or reading head 90. The cassette 10 furthermore, in the front part, in proximity to the apertures 21 and 22, has four holes 25, 26, 27 and 28 which pass through the thickness of the cassette.

The recording and/or reading apparatus comprises a base 29, arranged horizontally, on which there are mounted two revolving shafts 30 and 31 spaced to correspond with the axes of the spools 12 and 13. The upper part of each of the shafts 30 and 31 is shaped to form a pyramidal boss encircled by a toothed bush capable of engaging within the spools 12 and 13 respectively. The shafts 30 and 31 are each connected to a motor (not shown) arranged below the base, and through the respective toothed bushes are capable of effecting tape take up and fast forward and reverse winding.

Figure 2:
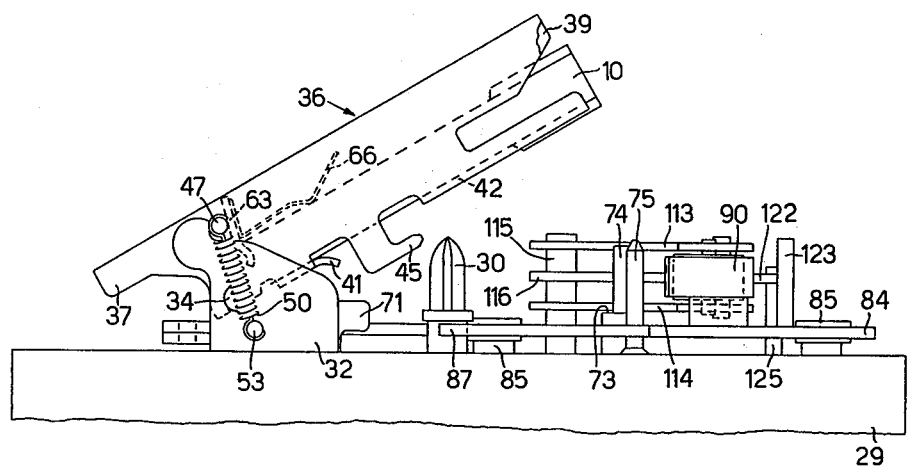
FIG. 2 is a side view of the apparatus in the position of rest.
Figure 3:
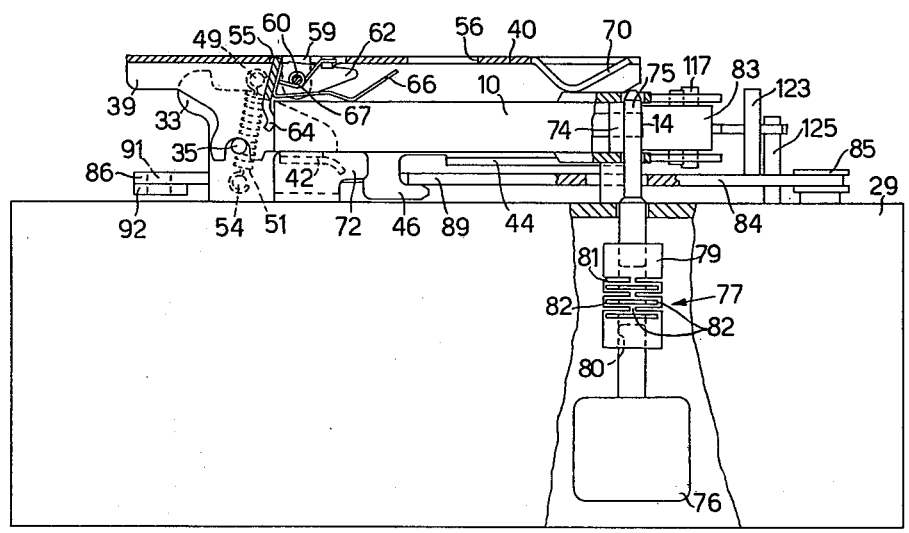
FIG. 3 is a partially sectioned side view of the apparatus in the working position.

Above the base 29 and fixed thereto there are arranged two vertical plates 32 and 33 each provided with a horizontal pin 34 and 35. On the pins 34 and 35 there is hinged a movable container 36, in which a cassette 10 is capable of being arranged (FIGS. 2 and 3).

The movable container 36 is constituted by two side walls 37 and 39, parallel to the plates 32 and 33, and by an upper wall 40 spanning the side walls. The side walls 37 and 39 have inwardly bent bottom edges forming flanges 41, 42, 43 and 44, on which the cassette 10 rests. The walls 37 and 39 of the container 36 are furthermore shaped so as to have two downwardly projecting hooks 45 and 46. The walls 37 and 39 are moreover provided externally with two pins 47 and 49, on which there are hooked two springs 50 and 51, hooked also on two pins 53 and 54 of the plates 32 and 33.

The upper wall 40 is provided with two windows 55 and 56. At the two ends of the window 55, two downturned lugs 57 and 58 support a transverse shaft 60. On the shaft 60 the arms 61 and 62 of a bail 63 are pivoted. The bail carries two downwardly projecting lugs 64 and 65 adapted to be abutted by the rear wall of the cassette 10. On the bail 63 there is fixed a leaf spring 66 adapted to bear on the upper part of the cassette 10. The lugs 64 and 65 are urged against the rear wall of the cassette 10 by two coiled tension springs 67 and 69.

The window 56 renders visible the shafts 30 and 31 and the tape wound on the spools.

The front part of the upper wall 40 is shaped as a leaf spring 70 capable of bearing on the upper part of the cassette 10.

In the working position, the rear part of the cassette 10 rests on two vertical plates 71 and 72 and the front part rests on the shoulders 73 of two locating pins 74 which are lodged in the holes 27 and 28 against which the cassette is thrust through the horizontal action of the lugs 64 and 65 of the bail 63 (FIG. 3).

A capstan shaft 75, made for example of steel, is mounted in the base 29 and passes freely through the hole 26 of the cassette 10. The shaft 75 is driven by an electric motor 76 and is connected to the motor by a resilient joint 77. The capstan shaft 76 cooperates with a pressure roller 83 to provide for the advance of the tape 14 (FIGS. 1 and 3).

The resilient hoint 77 (FIG. 4), constructed for example in plastics material, comprises a cylindrical body 79 with an axial bore 80 in which there are keyed the shaft 75 and the shaft of the motor 76. Perpendicularly to the bore 80 there are cut a plurality of pairs of slots 81, each of which pairs defines two diametrically opposed ribs 82; each pair of ribs is displaced angularly by 90° with respect to the adjacent pairs.

Figure 1:
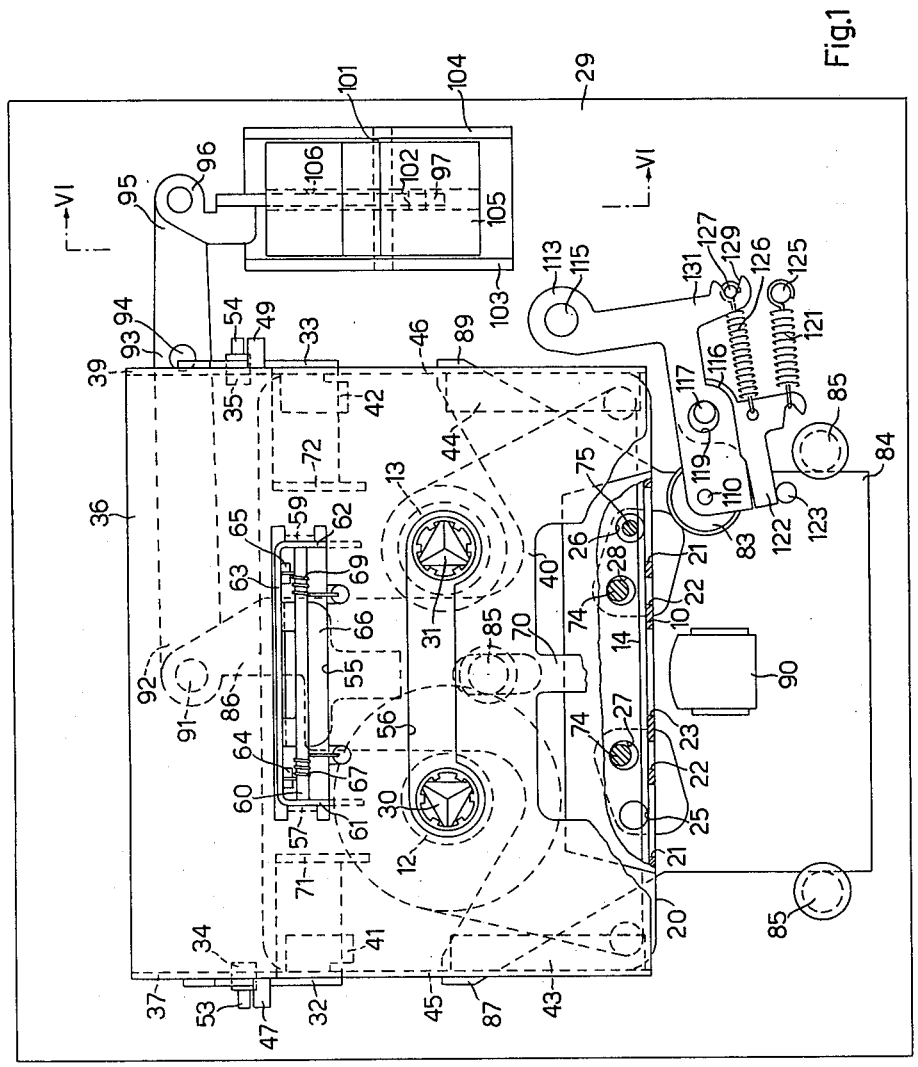
FIG. 1 is a plan view of the apparatus embodying the invention.

Parallel to the base 29 there is arranged an actuation plate 84 (FIG. 1), sliding on three guides 85, and provided with a central tongue 86 arranged between the shafts 30 and 31 and with two lateral wings 87 and 89 capable of engaging over the hooks 45 and 46 of the movable container 36 (FIGS. 1 and 3).

Figure 7:
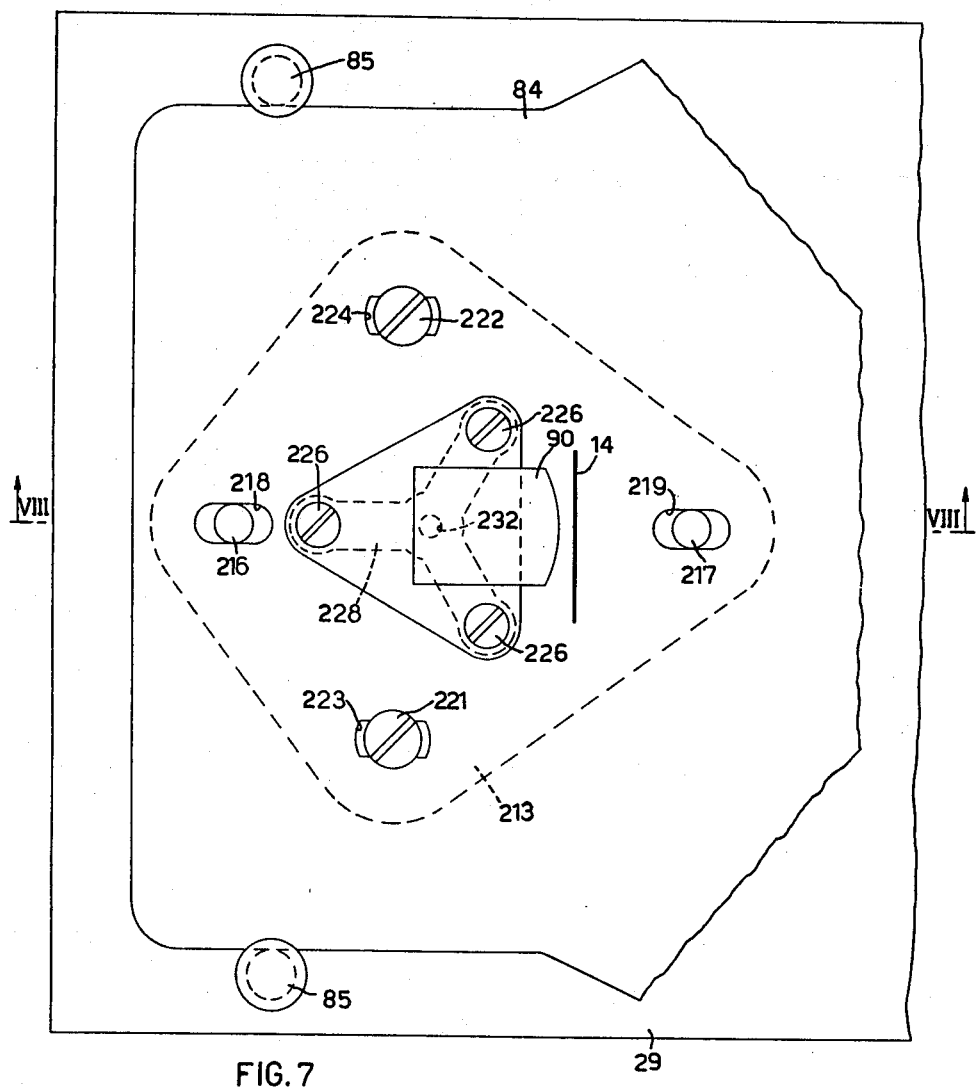
FIG. 7 is a plan view of a third detail of the apparatus.
Figure 8:
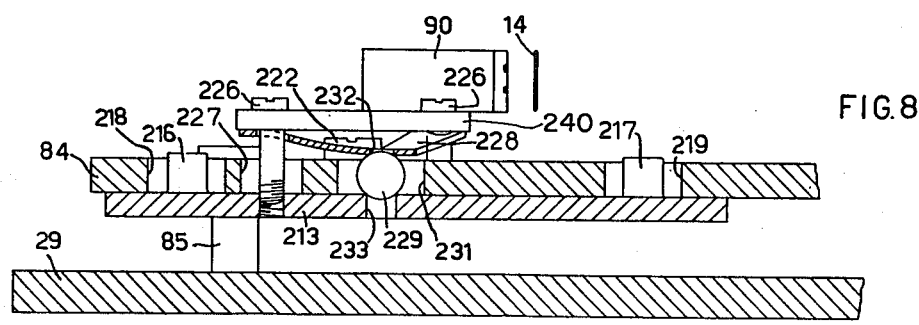
FIG. 8 is a section along the line VIII—VIII of FIG. 7.

The central part of the plate 84 carries the recording and/or reading head 90 fixedly mounted on mounting plate 240 and arranged in alignment with the aperture 23 of the cassette 10. In particular, below and parallel to the plate 84 there is arranged a positioning plate 213 (FIGS. 7 and 8) provided with two pins 216 and 217 lodged in two slotted holes 218 and 219 of the actuation plate 84. The plate 213 can be adjusted backwards and forwards and clamped in position by screws 221 and 222 passing through slots 223 and 224 in the plate 84.

The recording and/or reading head 90 is connected to the positioning plate 213 by three screws 226 passing freely through holes 227 in the plate 84. Below the recording and/or reading head 90 there is arranged a leaf spring 228 with three radiating arms at 120° to each other. The screws 226 pass through holes in the ends of the arms.

A ball 229 is clamped between the spring 228 and the plate 213, being located at the top by a hole 232 in the spring 228 and at the bottom by a hole 233 in the plate 213. The ball 229 acts to couple the leaf spring 228 to the positioning plate 213 and holds the spring clear of the actuation plate 84, allowing the sliding of the positioning plate 213 relative to the actuation plate 84.

The tongue 86 of the plate 84 is connected through a pin 91 to one arm 92 of a lever 93, fulcrumed on a pin 94 and whose other arm 95 is controlled by a lever 96. The lever 96 has at one of its ends 97 (FIG. 6) a slotted hole 99 in which there are lodged a shaft 101 and a pin 102. On the shaft 101, which is hinged on two vertical plates 103 and 104, integral with the base 29, there is fulcrumed a control knob 105, arranged between the plates 103 and 104, and provided with a slit 106 in which the end 97 of the lever 96 is arranged. The pin 102, which is lodged in the slotted hole 99, is integral with the knob 105.

Figure 5:
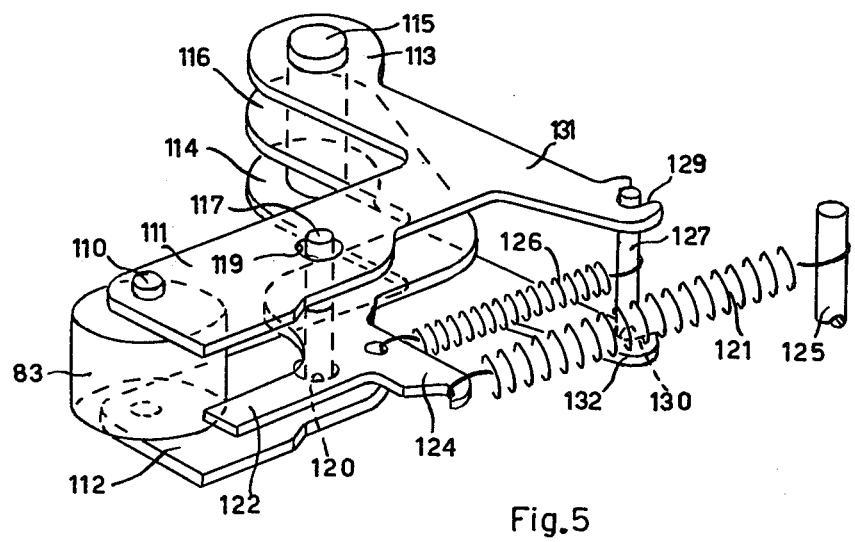
FIG. 5 is a perspective view of a second detail of the apparatus.

The pressure roller 83 (FIG. 5) is rotatable on a pin 110 between ends 111 and 112 of two support levers 113 and 114, arranged parallel keyed on a single shaft 115 fixed rotatably to the base 29. Between the levers 113 and 114 there is arranged an intermediate lever 116, which is pivoted on the shaft 115. The intermediate lever 116 supports rigidly a shaft 117, arranged perpendicular to the plane of the lever with its ends in two oversize holes 119 and 120 in the support levers 113 and 114. The lever 116 has an arm 122 capable of collaborating with a peg 123 fixed on the actuation plate 84 (FIGS. 1 and 5). A first spring 121, stretched between one end 124 of the lever 116 and a fixed pin 125 on the base 29, acts as resistant force for the whole system of levers which control the pressure roller 83. A second spring 126, stretched between the end 124 of the lever 116 and a cylindrical bar 127 which rests with its ends in two grooves 129 and 130 in two arms 131 and 132 of the support levers 113 and 114, urges the levers 113 and 114 to rotate clockwise relative to the lever 116 to the extent permitted by the lost motion coupling provided by the shaft 117 and the holes 119 and 120, thereby to achieve correct positioning of the pressure roller 83 against the capstan shaft 75.

Figure 6:
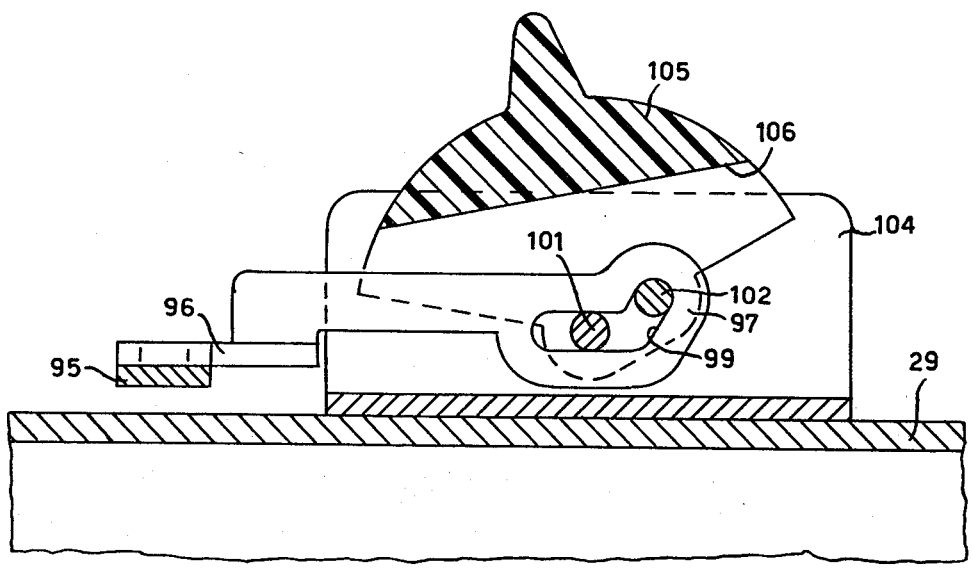
FIG. 6 is a section along the line VI—VI of FIG. 1.

In the position of rest, the movable container 36 is inclined upwards (FIG. 2) with the actuation plate 84 completely shifted towards the front (the right in FIG. 2), the knob 105 which controls it being in the position shown in FIG. 6.

When it is desired to record or read a magnetic tape contained in a cassette, the cassette 10 is pushed into the container 36 against the lugs 64 and 65 of the bail 63. In this position the spools 12 and 13 are aligned in correspondence with the pyramidal bosses of the shafts 30 and 31 and with the holes 27, 28 and 26 aligned in correspondence with the two pins 74 and the capstan shaft 75.

One then lowers the container 36 by hinging it downwardly on the pins 34 and 35 of the plates 32 and 33. The springs 50 and 51, which previously contributed to keeping the container 36 in the position of rest, now contribute to retaining it in the working position since the pins 47 and 49 move over-centre.

When the container 36 is lowered, the cassette 10 rests at the bottom on the plates 71 and 72 and on the shoulders 73 of the reference pins 74, the cassette being thrust downwards by the leaf springs 66 and 70. With such lowering of the cassette, the spools 12 and 13 are brought into engagement with the corresponding driving shafts 30 and 31, and the two pegs 74 and the shaft 75 enter the respective holes 27, 28 and 26. Furthermore, in this position an aperture 21 of the cassette 10 faces the pressure roller 83 and the aperture 23 faces the head 90. Through the action of the springs 67 and 68, the lugs 64 and 65 of the bail 63 thrust the cassette 10 against the reference pins 74.

The loading of the cassette 10 and the correct positioning thereof are therefore very simple and such as to require of the operator the use of one hand only.

When it is desired to adjust the position of the head 90 with regard to the tape 14, the adjustment in the longitudinal sense is carried out by sliding the positioning plate 213 relative to the plate 84, after having slackened the screws 221 and 222. The desired position being reached, the screws 221 and 222 are again tightened.

Fine adjustment in the vertical direction is carried out by screwing down the screws 226 on the positioning plate 213 equally so that the head 90 shifts while keeping parallel to the base plate 29. If it is desired, on the contrary, to cause the member 90 to rotate about a horizontal axis, one adjusts only one or two of the screws 226. The reaction of the leaf spring 228 is such as to prevent possible undesired displacements of the head 90. Furthermore, possible displacements in a plane parallel to the positioning plate 213 are prevented by the sphere 229.

In order to cause the tape 14 to advance at a low speed for recording it or reading it, the control knob 105 is pulled forwards. The pin 102 cams against the inclined front edge of the slot 99 (FIG. 6) thereby pulling the lever 96 forwards. The pulling forward of the lever 96 (FIG. 1) brings about the displacement to the rear of the actuation plate 84. The head 90 lodges in the aperture 23 of the cassette 10, coming into contact with the tape 14. At the same time, the peg 123 presses on the arm 122 of the lever 116, bringing the pressure roller 83 into contact with the capstan roller 75. Furthermore, the wings 87 and 89 of the plate slide over the hooks 45 and 46 of the container 36, preventing this from being raised when the head 90 is in the aperture 23, in this way avoiding damage to the head or the cassette.

In particular the peg 123 causes the lever 116 to rotate in the clockwise direction (FIG. 1) overcoming the action of the spring 121. With the rotation of such lever 116, also the support levers 113 and 114, drawn by the spring 126, rotate in the clockwise direction and bring the pressure roller 83 into contact with the tape 14, pressing against the capstan shaft or roller 75.

The electric motor 76 is then energised to rotate the capstan roller 75. The resilient joint 77 is manufactured from a light plastics material, in order that it shall have a low moment of inertia, whereby the increase in the overall moment of inertia is contained within satisfactory limits. The flexibility of the material and the transverse slots 81 guarantee a transmission of the movement without variations in speed even when the capstan roller 75 is not perfectly aligned with the shaft of the motor 76. A further advantage of the joint 77 is that it can be made by a single moulding process.

When recording or reading is finished, one pushes back the control knob 105 whereby the actuation plate 84 and the pressure roller 83 are brought back into the initial position of rest. Also the motor 76 is stopped. With the forward movement of the plate 84, the wings 87 and 89 are no longer over the hooks 45 and 46 of the container 36, whereby this can be swung up into the initial position of rest of FIG. 2. The cassette 10 can then be withdrawn from the container.

The wings 87 and 89 of the plate 84, apart from preventing the container 36 from being raised during the recording and/or reading phase, are capable of preventing this latter from being lowered from its position of rest if the actuation plate 84 has already been inadvertently actuated. In this way the head 90 and the cassette 10 are prevented from damaging each other.

From the preceding description it is clear that, with a single control action the actuation plate 84 positions simultaneously the pressure roller 83 and the recording and/or reading head 90; the actuation plate 84 with its wings 87 and 89 preventing the container 36 from changing its position when the plate has been actuated.

We claim:

1. In a cassette tape transport receptive of a tape cassette and of the type having a read/record head, an actuating plate carrying said head and means mounting said actuating plate for movement into and out of an operating position wherein said head is brought into engagement with a run of tape in the cassette, means mounting said head on said actuating plate for universal adjustment with respect to the run of tape comprising;

a positioning plate;

means mounting said positioning plate to said actuating plate for movement towards and away from run of tape and wherein said actuating plate is disposed between said head and said positioning plate; and means mounting said head to said positioning plate comprising at least three first clearance holes in said actuating plate, at least three adjusting screws connecting said head to said positioning plate and each freely passing through one of said first clearance holes and spring means biasing said head away from said actuating plate and comprising a leaf spring having a central section and at least three arms each engaging said head adjacent to the adjusting screws and means coupling the center of the leaf spring to the positioning plate comprising a second clearance hole in said actuating plate and a ball positioned between said leaf spring and said positioning plate and having a diameter to freely pass through said second clearance hole and to maintain said leaf spring clear of said actuating plate.

2. In a cassette tape transport receptive of a tape cassette and of the type having a read/record head, an actuating plate carrying said head and having an aperture therein and means mounting said actuating plate for movement into and out of an operating position wherein said head is brought into engagement with a run of tape in the cassette, means mounting said head on said actuating plate for universal adjustment with respect to the run of tape comprising;

a mounting plate on which said head is fixedly mounted;

a positioning plate connected to said actuating plate, wherein the actuating plate is disposed between the mounting plate and the positioning plate;

means connecting said mounting plate to said positioning plate to permit movement of said mounting plate perpendicular to the plane of said actuating plate and comprising three peripherally spaced screws;

a leaf spring disposed between the actuating plate and the mounting plate for biasing the mounting plate away from said actuating plate and comprising a central portion and three arms, each arm contacting the mounting plate adjacent to one of the screws; and a locating member disposed in the aperture of the actuating plate and connecting the central portion of the leaf spring with said positioning plate and permitting said movement of the mounting plate with respect to the actuating plate.

3. In a cassette tape transport according to claim 2, wherein said positioning plate has a recess therein and said locating member is a ball disposed in said recess.

* * * * *